Figure 1:
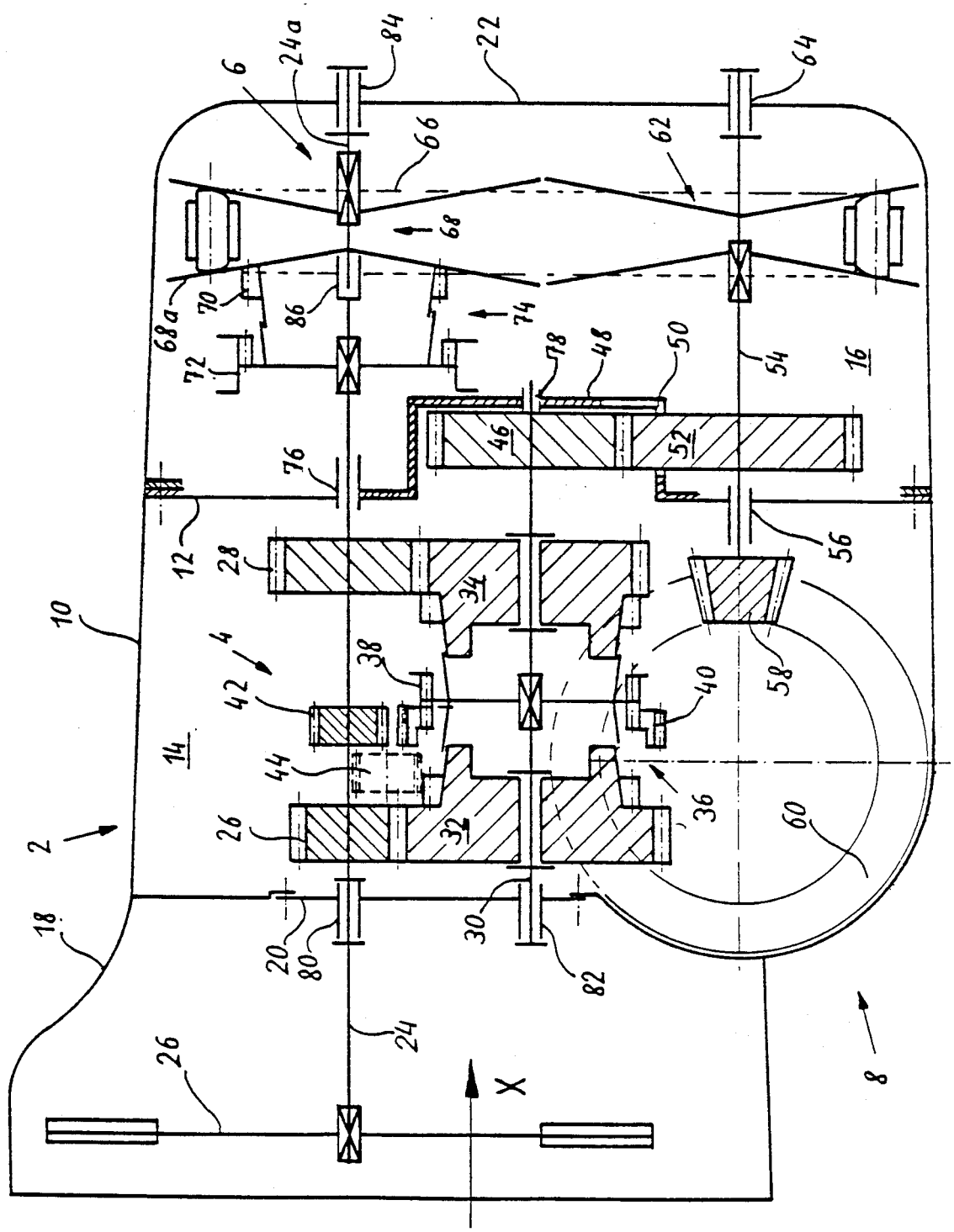

United States Patent [19]

Höhn

[11] Patent Number: 4,548,100
[45] Date of Patent: Oct. 22, 1985

[54] TRANSMISSION FOR MOTOR VEHICLES

[75] Inventor: Bernd-Robert Höhn, Kosching, Fed. Rep. of Germany

[73] Assignee: Audi NSU Auto Union AG, Fed. Rep. of Germany

[21] Appl. No.: 653,468

[22] Filed: Sep. 20, 1984

Related U.S. Application Data

[63] Continuation of Ser. No. 374,062, May 3, 1982.

[30] Foreign Application Priority Data

May 7, 1981 [DE] Fed. Rep. of Germany ....... 3118075

[51] Int. Cl.[4] .................. F16H 37/00; F16H 37/06
[52] U.S. Cl. .................. 74/689; 74/665 GE
[58] Field of Search ............ 74/689, 740, 745, 606 R, 74/665 GE; 474/8, 37, 38

[56] References Cited

U.S. PATENT DOCUMENTS

| 2,188,403 | 1/1940 | Frisby | 74/745 X |
| 2,343,312 | 3/1944 | Maurer | 74/740 X |
| 2,835,143 | 5/1958 | Kelbel | 74/745 X |
| 3,340,749 | 9/1967 | Magg et al. | 74/689 |
| 3,442,346 | 5/1969 | Winter et al. | 74/689 X |
| 4,294,137 | 10/1981 | Piret et al. | 74/665 GE X |
| 4,308,763 | 1/1982 | Brisabois | 74/606 R X |

FOREIGN PATENT DOCUMENTS

| 4412 | 10/1979 | European Pat. Off. | 74/689 |
| 740071 | 10/1943 | Fed. Rep. of Germany | |
| 818300 | 10/1951 | Fed. Rep. of Germany | |
| 1022916 | 10/1959 | Fed. Rep. of Germany | |
| 1540196 | 9/1971 | Fed. Rep. of Germany | |
| 1271210 | 7/1961 | France | |
| 2054774 | 2/1981 | United Kingdom | 74/689 |

Primary Examiner—Leslie A. Braun
Assistant Examiner—Dirk Wright
Attorney, Agent, or Firm—Lalos, Leeds, Keegan, Marsh, Bentzen & Kaye

[57] ABSTRACT

A transmission for motor vehicles having a conical-disc band transmission placed in a casing, a reduction gear and, if necessary, a differential. In order to achieve an optimum transmission-ratio range for motor vehicles and good efficiency, the reduction gear contains two forward speeds and is connected to a fixed gear on the power take-off shaft by means of an additional fixed gear. The driving disc pairs of the conical-disc band transmission are located directly on a section of the drive shaft and on the power take-off shaft. The reduction gear and the conical-disc band transmission can be actuated by means of conventional synchronous clutches. The transmission case is longitudinally fitted with a center wall which subdivides the space into two compartments, one of which is closed by a front cover and the other by a rear cover. While one compartment contains the reduction gear and, if necessary, the differential, the other compartment contains the conical-disc band transmission.

22 Claims, 2 Drawing Figures

TRANSMISSION FOR MOTOR VEHICLES

This application is a continuation of application Ser. No. 374,062, filed May 3, 1982.

This invention relates to a transmission mechanism for motor vehicles.

This invention more particularly relates to a transmission which has become known through European patent application No. 004 487. The transmission consists of a conical-disc band transmission and a reduction gear mechanism having a forward and a reverse speed. Power input to the transmission is achieved through a plurality of drive shafts arranged coaxially one above the other and engaging a gear of the reduction gear as well as the driving disc pair of the disc band transmission. The drive shafts are connected to the internal combustion engine by means of hydraulically-operated clutches. In addition, the forward speed, which may be designed as the first gear, and the reverse speed are shifted by means of a toothed coupling.

The known transmission mechanism thus requires a mechanical and a hydraulic gear shift so that, and also in view of the fact that the drive shafts are arranged coaxially one above the other, a complex transmission design results. Furthermore, without considering the reverse speed, the transmission contains two intermediate shafts and, hence, occupies a large space. Also, because of the many gear meshings in the step-down range and the required step-up range of the disc band transmission, the known transmissions are not as efficient as they could be.

Thus, an object of this invention is to create a similar type of transmission which is more efficient and less expensive and requires minimum installation effort.

This object is achieved according to the teachings of the present invention. The transmission embodying the present invention has a simple construction inasmuch as no coaxial shafts are arranged one above the other and no hydraulic clutches are used. By asociating two forward speeds with the disc band transmission and by using a total transmission-range spread optimally designed for motor vehicles, only one transmission-ratio range of three is needed for the disc band transmission, with the result that a good overall efficiency is achieved. Also, since the transmission has only one intermediate shaft for the forward driving range, there are fewer gear meshings in the step-down range. In addition, the transmission design is simplified and the space required for the transmission is reduced.

The transmission control also is simplified considerably by the teachings of the present invention. The engagement of the disc band is similar to the third speed in a conventional manually-shifted transmission. The synchronous clutch can be similar to conventional synchronizing mechanisms in manually shifted transmissions. Following engagement of the disc band transmission, no further manual shifting actions are necessary, because the subsequent transmission-ratio control of the disc band transmission is only dependent upon the speed and the load of the motor vehicle. Further, the synchronous clutch for the driving disc pair of the disc band transmission can be located on the drive shaft and the synchronous clutch for the first and second forward speeds can be arranged on the intermediate shaft. Only minimal inertial forces have to be overcome in the synchronization process during shifting in such embodiment.

A transmission with a differential integrally built into the case for providing power to the axles of a motor vehicle can also be developed according to the present invention. Both the intermediate shaft and the output disc pair of the disc band transmission act directly on the differential through the power take-off shaft, so that the transmission design is further simplified and additional losses in efficiency are avoided.

A very compact and—compared to a manual 4-speed transmission gearshift without a disc band transmission—only a slightly larger transmission with a transversely mounted differential is taught by the present invention. This arrangement permits a minimum distance to be obtained between the drive shaft and the intermediate shaft, between the intermediate shaft and the power take-off shaft, and between the intermediate shaft and the center of the differential. Thus, the ground clearance of the motor vehicle is not thereby impaired.

A lowering of the production cost for the transmission case and a reduction of the construction volume results when the differential and the reduction gear are located in the same compartment as taught herein.

The transmission case can, furthermore, be designed so that it has an intermediate dividing wall. This results in an integrally rigid case which is simple to manufacture and is easily accessible lengthwise through removable end covers for assembling the transmission parts. From the standpoint of rapid assembly, further development of the transmission is possible according to the features of the present invention wherein the preassembled front drive shaft and the intermediate shaft, as well as the reduction gear mechanism, can be assembled together with the front cover, while the conical-disc band transmission and the power take-off shaft can be mounted from the other direction, together with the rear cover.

Finally, the overall length of the transmission is reduced in accordance with the features set forth herein since the step-down reduction gear mechanism is made shorter and, moreover, the required space for the fixed gears is already available in the disc band transmission.

Other objects and advantages of the present invention will become more apparent to those persons having ordinary skill in the art to which the present invention pertains from the foregoing description taken in conjunction with the accompanying drawings.

Figure 2:
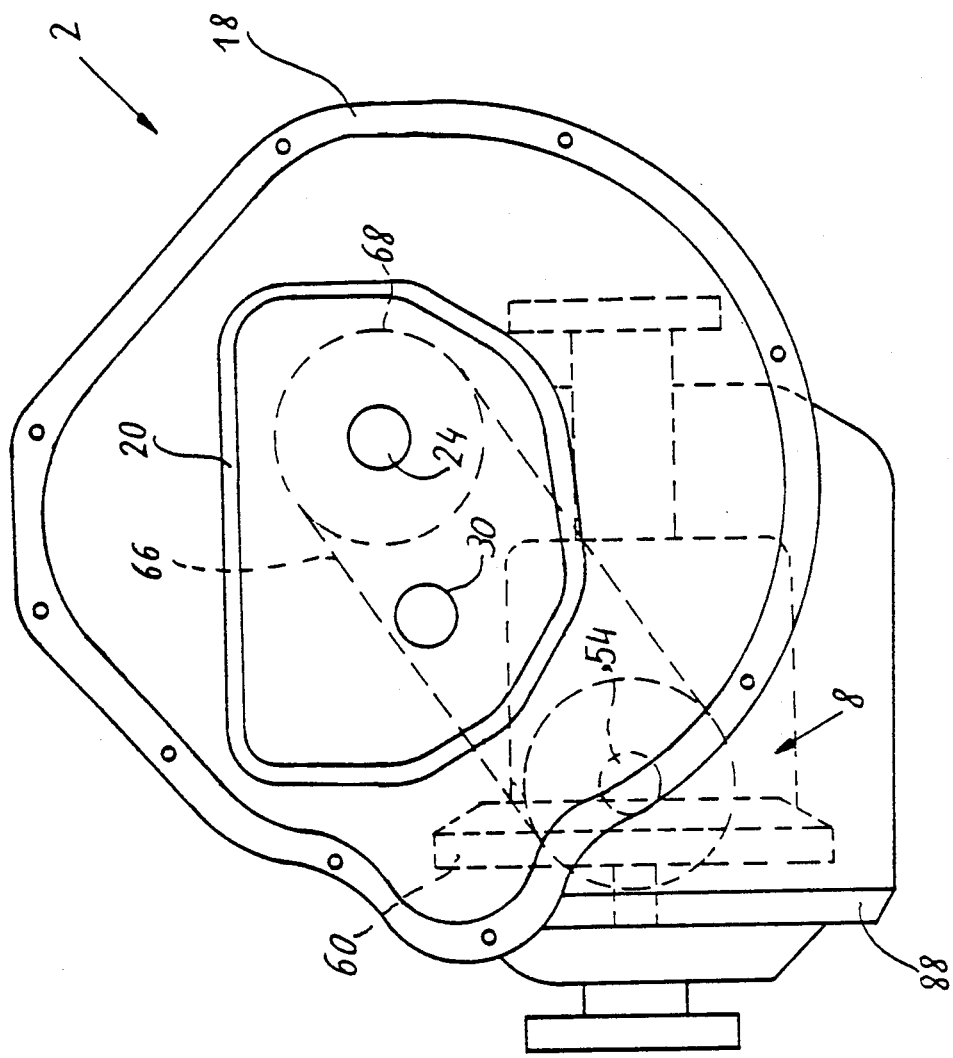

FIG. 1 is a diagrammatic longitudinal cross section through a transmission based on this invention, wherein the intermediate shaft has been rotated from the actual position shown in FIG. 2 into the cross-sectional plane; and FIG. 2 is a view in the direction of the arrow X of FIG. 1.

The figures represent a motor vehicle transmission having a case 2, in which a reduction gear mechanism 4, a conical-disc band or continuously-variable belt-type transmission 6, and a transversely-mounted differential 8 are positioned. The transmission case consists of a case 10 with a center wall 12, which separates case 10 into two compartments 14 and 16. A bell-shaped transmission case 18 is fitted to the case 10.

The compartment 14 is closed by a front cover 20 and compartment 16 by a rear cover 22. The transmission case 10 contains a drive shaft 24, which can be connected to an internal combustion engine (not shown) through a dry-friction clutch 26, which is only sketched herein. Attached to the drive shaft 24 are two gears 26, 28, which are in continuous engagement with the gears 32, 34 attached to the intermediate shaft 30. These gears 32, 34 can be coupled to the intermediate shaft 30 through a synchronous clutch 36 and form a first forward speed by engaging gears 32 and 26. By engaging the gear 34 with the gear 28, a second forward speed of the reduction gear mechanism 4 is produced. The sleeve 38 of the synchronous clutch 36 contains another gear 40 which, together with the gear 42 on the drive shaft 24 and a sliding reverse gear 44, located in the case 10, produces a reverse speed.

Furthermore, a fixed gear 46 is mounted on the intermediate shaft 30. Fixed gear 46 is located within a bulge 48 of the central wall 12, which extends into compartment 16, and engages a fixed gear 52 through a recess 50 in bulge 48. As shown in FIG. 1, fixed gear 52 is mounted on the power take-off shaft 54.

Power take-off or power output shaft 54 is supported by a radial bearing 56, e.g., a roller bearing, located in the central wall 12 and carrying a drive pinion 58 at the end, which extends into the compartment 14. Drive pinion 58 engages the bevel gear 60 of the differential 8.

Within the compartment 16, the power take-off shaft 54 carries an output disc pair or output pulley 62 of the disc band transmission 6 and is radially and axially supported by a bearing 64, e.g., a ball bearing, located in the cover 22. The output disc pair 62, together with the chain 66 and the driving disc pair or driving pulley 68, form the conical-disc band transmission 6, which can achieve a continuously-variable transmission-ratio range of R equal to three, by adjusting either disc. However, the detailed operation of the conical-disc band transmission 6 does not constitute the subject matter of the invention and is therefore not described further herein.

The driving disc pair 68 is situated on a rear section 24a of the drive shaft 24 and carries a toothed coupling 70 on the fixed disc 68a which, together with the sleeve 72 on the drive shaft 24, form a synchronous clutch 74.

The drive shaft 24, its front section, and the intermediate shaft 30 are each respectively supported in the central wall 12 by radial bearings 76, 78, and the cover 20 by a combination radial and thrust bearings 80, 82. The rear section 24a of the drive shaft 24 is supported by a combination axial and thrust bearing 84 in the rear cover 22, while the front section of the drive shaft 24 and the rear section 24a are telescoped by the intermediate needle bearing 86.

As can be seen in the FIG. 1, the conical-disc band transmission 6 is located in compartment 16, while reduction gear mechanism 4, together with differential 8, is situated in compartment 14 of transmission case 2. FIG. 2 shows the transmission as viewed in the direction X of FIG. 1, which also corresponds to the mounting position of the transmission in the motor vehicle. As is apparent from FIG. 2, the intermediate shaft 30 is placed in a substantially horizontal position next to the drive shaft 24. The power take-off shaft 54 lies below the intermediate shaft and, viewed in the horizontal direction, is situated farther from the drive shaft 24 than the intermediate shaft 30. Thus, the bevel gear 60 of the differential 8 can be placed at an elevation such as not to affect the ground clearance of the motor vehicle.

The transmission shown can be assembled as follows: The bearings 80, 82, the drive shaft 24 with the gears 26, 42, 28, the intermediate shaft 30 with gears 32, 34, and the synchronous clutch 36 are preassembled on front cover 20. Following preparation of the case 10, the preassembled reduction gear mechanism 4 with the cover 20 are inserted into case 10, the drive shaft 24 and the intermediate shaft 30 being slid into the radial bearings 76, 78. Then, disc band transmission 6, power take-off shaft 54, section 24a of the drive shaft 24, which are preassembled in the rear cover 22, are mounted to the case 10 from the opposite direction. The differential 8 with the bevel gear 60 are fitted into the compartment 14 through the side cover 88, as best shown in FIG. 2.

When the synchronous clutches 36, 74 are in the position shown in FIG. 1, the transmission is in the idle position. The first forward speed is obtained by moving sleeve 38 to the left relative to FIG. 1 and by engaging the gear 32 with the intermediate shaft 30. Power is then transmitted to the differential 8 from the drive shaft 24, through the gears 26, 32, the intermediate shaft 30, the fixed gears 46, 52, the power take-off shaft 54, and the drive pinion 58. The second forward speed is obtained by engaging the gear 34 with the intermediate shaft 30 so that, unlike the first forward speed, power is transmitted through gears 28, 34.

By moving the sleeve 72 of the synchronous clutch 74, the disc pair 68 is connected to the drive shaft 24, so that power is transmitted to the power take-off shaft 54 from the drive shaft 24, the driving disc pair 68, the chain 66, and the output disc pair 62. The third forward speed can be achieved without steps in a transmission-ratio range of R equals three, depending on the speed and the load of the motor vehicle. To do this, either of the driving disc pairs can, for example, be adjusted hydraulically in a known manner.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A transmission for motor vehicles comprising:
   a case,
   a conical-disc band transmission enclosed in said case, said band transmission including an output disc pair and a driving disc pair,
   a reduction gear having first and second forward speeds enclosed in said case,
   a drive shaft to which one gear of said reduction gear or said driving disc pair of said band transmission can be connected,
   a power take-off shaft disposed parallel to said drive shaft, said power take-off shaft being connected to said output disc pair,
   an intermediate shaft including at least one gear, said gear being couplable with gears on said drive shaft and on said power take-off shaft,
   said reduction gear including a first pair of gears mounted on said drive shaft for the first and second forward speeds,
   said driving disc pair being mounted on said drive shaft,
   said intermediate shaft including a second pair of gears for the first and second forward speeds and a fixed gear,
   said power take-off shaft including a fixed gear engaging said intermediate shaft fixed gear,
   said power take-off shaft fixed gear transferring mechanical power from said drive shaft to said power take-off shaft when said drive shaft is connected to said reduction gear, a synchronous clutch for shifting said first pair of gears and said second pair of gears for the first and second forward speeds of said reduction gear, a differential integrally built into said case, an intermediate wall positioned in said case and dividing said case into a first compartment and a second compartment, a bearing means for said drive shaft, said intermediate shaft and said power take-off shaft, said intermediate wall supporting said bearing means, a first cover for closing off said first compartment, said first cover supporting said drive shaft and said intermediate shaft, a second cover for closing off said second compartment, said second cover supporting said drive shaft and said power take-off shaft, said disc band transmission being disposed in said second compartment, said differential and said reduction gear being disposed in said first compartment, said intermediate wall including a bulge segment extending into said second compartment, said bulge segment defining a bulge area in said first compartment, said intermediate shaft including a fixed gear disposed in said bulge area, said power take-off shaft including a fixed gear corresponding to said intermediate shaft fixed gear and disposed in said second compartment, and said intermediate shaft fixed gear and said power take-off shaft fixed gear engaging each other through an opening in said bulge segment.

2. The transmission according to claim 1 wherein, said power take-off shaft drives said differential by a drive pinion means.

3. The transmission according to claim 2 wherein, said differential includes a power take-off means positioned at right angles to said drive shaft and to said power take-off shaft, said intermediate shaft is positioned substantially horizontally next to said drive shaft, said differential lies below said intermediate shaft, said differential includes a bevel gear engaging said drive pinion means, and said power take-off shaft, said drive pinion means and said bevel gear are located at a greater horizontal distance from said drive shaft than said intermediate shaft.

4. The transmission according to claim 3 further comprising:

said drive shaft including a rear section in the area of said intermediate wall, and said drive shaft and said rear section being telescoped within each other.

5. The transmission according to claim 1 further comprising:

said drive shaft including a rear section in the area of said intermediate wall, and said drive shaft and said rear section being telescoped within each other.

6. A transmission for motor vehicles comprising:

a drive shaft, a first pair of gears mounted on said drive shaft, an intermediate shaft associated with said drive shaft, a second pair of gears attached to said intermediate shaft, a synchronous clutch mechanism for shifting said first pair of gears and said second pair of gears for providing first and second forward speeds, a power take-off shaft disposed parallel to said drive shaft, an intermediate shaft fixed gear attached to said intermediate shaft, an power take-off shaft fixed gear attached to said power take-off shaft and engaging said intermediate shaft fixed gear, a conical-disc band transmission including a driving disc pair mounted to said drive shaft and further including an output disc pair connected to said power take-off shaft and disposed so that said intermediate shaft is positioned between said driving disc pair and said output disc pair, a case enclosing said conical-disc band transmission, a differential integrally built into said case, an intermediate wall positioned in said case and dividing said case into a first compartment and a second compartment, a bearing means supported by said intermediate wall for said drive shaft, said intermediate shaft and said power take-off shaft, a first cover for closing off said first compartment, said first cover supporting said drive shaft and said intermediate shaft, a second cover for closing off said second compartment, said second cover supporting said drive shaft and said power take-off shaft, said conical-disc band transmission being disposed in said second compartment, said differential and said first and second pairs of gears being disposed in said first compartment, said intermediate wall including a bulge segment extending into said second compartment, said bulge segment defining a bulge area in said first compartment, said intermediate shaft fixed gear being disposed in said bulge area, said power take-off shaft fixed gear being disposed in said second compartment, and said intermediate shaft fixed gear and said power take-off shaft fixed gear engaging each other through an opening in said bulge segment.

7. The transmission of claim 6 including, said conical-disc band transmission being disposed generally perpendicular to said drive shaft.

8. The transmission of claim 6 including, a synchronous clutch means mounted on said drive shaft and engaging said driving disc pair of said disc band transmission for shifting said conical-disc band transmission.

9. The transmission of claim 6 including, a differential driven by said power take-off shaft by a drive pinion means, said differential including a power take-off means positioned at right angles to said drive shaft and to said power take-off shaft, said intermediate shaft being positioned substantially horizontally next to said drive shaft, said differential being positioned below said intermediate shaft and including a bevel gear engaging said drive pinion means, and said power take-off shaft, said drive pinion means, and said bevel gear being located at a greater horizontal distance from said drive shaft than said intermediate shaft.

10. The transmission of claim 9 including,
a case enclosing said conical-disc band transmission, and
said case including at least a first chamber in which said differential, said first pair of gears and said second pair of gears are positioned.

11. A transmission for motor vehicles comprising:
a drive shaft rotatable about a first axis,
a first pair of gears rotatably fixed with said drive shaft,
an intermediate shaft associated with said drive shaft and rotatable about a second axis,
a second pair of gears freely rotatable on said intermediate shaft,
said first pair of gears rotatably engaging said second pair of gears,
a synchronous clutch mechanism mounted on said intermediate shaft for shifting said first pair of gears and said second pair of gears for thereby providing first and second forward speeds,
a power output shaft disposed parallel to said first axis and rotatable about a third axis,
said second axis being disposed between said first and third axes,
an intermediate shaft fixed gear mounted to said intermediate shaft,
a power output shaft fixed gear mounted to said power output shaft and engaging said intermediate shaft fixed gear, and
a continuously-variable belt-type transmission positioned generally parallel to said first and third axes and including a driving pulley connected to said drive shaft and further including an output pulley positioned on said power output shaft.

12. The transmission of claim 11 including,
a synchronous clutch means operatively connected to said continuously-variable belt-type transmission for shifting said continuously-variable belt-type transmission.

13. The transmission of claim 12 including,
said synchronous clutch means being mounted on said drive shaft.

14. The transmission of claim 12 including,
said synchronous clutch means engaging said driving pulley.

15. The transmission of claim 13 including,
said synchronous clutch means engaging said driving pulley.

16. The transmission of claim 11 including,
a differential operatively connected to and driven by said power output shaft.

17. The transmission of claim 16 including,
a drive pinion means operatively connected to said power output shaft and to said differential for driving said differential.

18. The transmission of claim 17 including,
said differential including a bevel gear engaging said drive pinion means.

19. The transmission of claim 17 including,
said power output shaft, said drive pinion means and said bevel gear being located at a greater horizontal distance from said drive shaft than said intermediate shaft.

20. The transmission of claim 16 including,
said differential including a power take-off means positioned at right angles to said first and third axes.

21. The transmission of claim 16 including,
said second axis being positioned substantially horizontally next to said first axis, and
said differential being positioned below said second axis.

22. The transmission of claim 11 including,
a case enclosing said continuously-variable belt-type transmission, and
said case including a first chamber,
a differential integrally built into said case, and
said differential and said first and second pairs of gears being positioned in said first chamber.

* * * * *